(12) United States Patent
Yasui et al.

(10) Patent No.: US 11,485,338 B2
(45) Date of Patent: Nov. 1, 2022

(54) ELECTRIC BRAKING DEVICE FOR VEHICLE

(71) Applicant: ADVICS CO., LTD., Kariya (JP)

(72) Inventors: Yoshiyuki Yasui, Nagoya (JP); Tomonori Katsuyama, Toyoake (JP)

(73) Assignee: ADVICS CO., LTD., Kariya (JP)

( * ) Notice: Subject to any disclaimer, the term of this patent is extended or adjusted under 35 U.S.C. 154(b) by 173 days.

(21) Appl. No.: 16/937,422

(22) Filed: Jul. 23, 2020

(65) Prior Publication Data

US 2020/0353911 A1    Nov. 12, 2020

Related U.S. Application Data

(62) Division of application No. 16/070,811, filed as application No. PCT/JP2017/001646 on Jan. 19, 2017, now Pat. No. 10,759,408.

(30) Foreign Application Priority Data

Jan. 22, 2016    (JP) ................................. 2016-010270

(51) Int. Cl.
    *B60T 13/74*    (2006.01)
    *B60T 8/17*     (2006.01)
    (Continued)

(52) U.S. Cl.
    CPC ............ *B60T 13/741* (2013.01); *B60T 1/065* (2013.01); *B60T 7/042* (2013.01); *B60T 7/107* (2013.01);
    (Continued)

(58) Field of Classification Search
    CPC ........... F16D 2121/24; F16D 2066/003; F16D 2066/005; F16D 2125/40; F16D 2125/48; B60T 13/741
    See application file for complete search history.

(56) References Cited

U.S. PATENT DOCUMENTS 6,213,259 B1    4/2001    Hanson et al.
6,215,672 B1 *  4/2001    Warner ................... B60T 8/368
                                                    73/514.01
(Continued)

FOREIGN PATENT DOCUMENTS

DE    102009046044 A1 *  5/2010    ............ B60T 13/741
DE    102010040426 B4 *  9/2020    ............ F16D 65/18
(Continued)

OTHER PUBLICATIONS

Machine translation of DE 10 2009 046 044, retrieved Mar. 10, 2022 (Year: 2022).*

(Continued)

*Primary Examiner* — Bradley T King
(74) *Attorney, Agent, or Firm* — Buchanan Ingersoll & Rooney PC

(57) ABSTRACT

This electric braking device is provided with: an electric motor MTR that, in accordance with an operation amount Bpa of a braking operation member BP, generates a pressing force Fba, being a force pressing a friction member MSB against a rotary member KTB that rotates integrally with a wheel WHL of the vehicle; and a circuit board KBN to which a processor MPR and a bridge circuit BRG are mounted. The device is further provided with a rotation angle sensor MKA for detecting the rotation angle Mka of the electric motor, and drives the electric motor MTR on the basis of the rotation angle Mka. An end face Mmk of the rotation angle sensor MKA is fixed so as to be in contact with the circuit board KBN. The device is further provided with a pressing force sensor FBA for detecting the pressing force Fba, and drives the electric motor MTR on the basis of the pressing force Fba. An end face Mfb of the pressing force sensor FBA is fixed so as to be in contact with the circuit board KBN.

1 Claim, 6 Drawing Sheets

(51) Int. Cl.
*F16D 65/18* (2006.01)
*B60T 7/04* (2006.01)
*B60T 8/171* (2006.01)
*B60T 7/10* (2006.01)
*B60T 8/00* (2006.01)
*H02K 11/21* (2016.01)
*H02K 11/33* (2016.01)
*B60T 1/06* (2006.01)
*H02K 7/102* (2006.01)
*H02K 7/116* (2006.01)
*F16D 121/24* (2012.01)
*F16D 66/00* (2006.01)
*F16D 125/40* (2012.01)
*F16D 125/48* (2012.01)

(52) U.S. Cl.
CPC ............... *B60T 8/00* (2013.01); *B60T 8/17* (2013.01); *B60T 8/171* (2013.01); *B60T 13/746* (2013.01); *F16D 65/18* (2013.01); *F16D 65/183* (2013.01); *H02K 7/102* (2013.01); *H02K 7/116* (2013.01); *H02K 11/21* (2016.01); *H02K 11/33* (2016.01); *F16D 2066/005* (2013.01); *F16D 2121/24* (2013.01); *F16D 2125/40* (2013.01); *F16D 2125/48* (2013.01); *H02K 2211/03* (2013.01)

(56) References Cited

U.S. PATENT DOCUMENTS

| | | | |
|---|---|---|---|
| 6,241,489 B1* | 6/2001 | Lewin | B60T 8/368 439/744 |
| 6,513,632 B2 | 2/2003 | Peter | |
| 7,325,658 B2 | 2/2008 | Halasy-Wimmer et al. | |
| 7,448,475 B2 | 11/2008 | Mourad et al. | |
| 7,734,408 B2 | 6/2010 | Shiraki | |
| 9,500,240 B2 | 11/2016 | Fuse et al. | |
| 2003/0083797 A1 | 5/2003 | Yokoyama et al. | |
| 2006/0108884 A1 | 5/2006 | Shiino et al. | |
| 2007/0199775 A1 | 8/2007 | Yasukawa | |
| 2007/0228824 A1 | 10/2007 | Yasukawa et al. | |
| 2012/0070324 A1* | 3/2012 | Haecker | H02K 11/215 417/415 |
| 2012/0103733 A1 | 5/2012 | Sekiguchi | |
| 2014/0283635 A1 | 9/2014 | Masuda et al. | |
| 2015/0090540 A1 | 4/2015 | Katsuyama et al. | |
| 2015/0323027 A1 | 11/2015 | Bourlon | |
| 2015/0360667 A1 | 12/2015 | Yasui et al. | |
| 2018/0017451 A1* | 1/2018 | Iesato | G01L 5/22 |
| 2018/0045593 A1* | 2/2018 | Beason | G01L 5/225 |
| 2018/0065609 A1* | 3/2018 | Leiber | B60T 8/368 |
| 2018/0065612 A1* | 3/2018 | Loeffler | B60T 8/52 |
| 2018/0083507 A1 | 3/2018 | Tokizaki et al. | |
| 2018/0215369 A1 | 8/2018 | Tsukamoto | |
| 2018/0362009 A1* | 12/2018 | Bourlon | B60T 13/741 |
| 2019/0016325 A1 | 1/2019 | Yasui et al. | |
| 2019/0023248 A1 | 1/2019 | Yasui | |

FOREIGN PATENT DOCUMENTS

| | | |
|---|---|---|
| JP | 2007278311 A | 10/2007 |
| JP | 2014075866 A | 4/2014 |
| JP | 2015068445 A | 4/2015 |

OTHER PUBLICATIONS

International Search Report (PCT/ISA/210) dated Apr. 25, 2017, by the Japanese Patent Office as the International Searching Authority for International Application No. PCT/JP2017/001646.

Written Opinion (PCT/ISA/237) dated Apr. 25, 2017, by the Japanese Patent Office as the International Searching Authority for International Application No. PCT/JP2017/001646.

* cited by examiner

ELECTRIC BRAKING DEVICE FOR VEHICLE

CROSS REFERENCES TO RELATED APPLICATIONS

This application is a Divisional of U.S. application Ser. No. 16/070,811 filed Jul. 18, 2018, which is the National Stage of PCT/JP2017/001646 filed Jan. 19, 2017, and claims the benefit of Japanese Application No. JP2016-010270 filed Jan. 22, 2016, the entire content of each of which is incorporated by reference herein.

TECHNICAL FIELD

The present invention relates to an electric braking device for a vehicle.

BACKGROUND ART

JP2007-278311A describes "an electric braking device having an integrated structure with an electric circuit unit, in which, with an aim to improve countermeasures of this driving circuit against heat, an electric circuit unit DCP is provided facing a brake pad with a motor therebetween, a power module 408 is provided so that an inner surface of a metal outer casing 500 of the electric circuit unit DCP faces a heat dissipating surface, and a control circuit board 404 is provided on a motor side relative to the power module 408".

Upon installation, an electric braking device is demanded to be accommodated within a tire wheel and also to avoid interfering with a suspension member and the like. Due to this, the electric braking device is yearned to have a configuration which can be made compact. A configuration of JP2007-278311A configures its electric motor and power transmission mechanism coaxially, and respective sensors are connected to an electric circuit via sensor terminals. Each of the sensors needs not only a detection unit but also a circuit and the like for outputting signals. For example, in the above configuration, in a rotation angle sensor, its sensor signal is connected to the electric circuit by the terminal sensor from an outer periphery of a reduction gear. Thus, in this configuration, downsizing in a radial direction of the electric motor is difficult.

SUMMARY OF INVENTION

Technical Problems

The present invention aims to downsize an electric braking device for a vehicle and to improve mountability to the vehicle.

Solutions to Problems

An electric braking device for a vehicle according to the present invention includes: an electric motor (MTR) configured to generate a pressing force (Fba) in accordance with an operation amount (Bpa) of a braking operation member (BP) by a driver of the vehicle, the pressing force being a force for pressing a friction member (MSB) against a rotary member (KTB) that rotates integrally with a wheel (WHL) of the vehicle; a rotation angle sensor (MKA) configured to detect a rotation angle (Mka) of the electric motor; and a circuit board (KBN) configured to implement a microprocessor (MPR) and a bridge circuit (BRG) so as to drive the electric motor (MTR) based on the rotation angle (Mka).

In the electric braking device for a vehicle according to the present invention, an end face (Mmk) of the rotation angle sensor (MKA) is fixed to contact the circuit board (KBN). By having the rotation angle sensor (MKA) arranged as above, a size of the electric motor MTR along a rotation axis Jmt direction is reduced, and mountability of the electric braking device to the vehicle can be improved.

An electric braking device for a vehicle according to the present invention includes: an electric motor (MTR) configured to generate a pressing force (Fba) in accordance with an operation amount (Bpa) of a braking operation member (BP) by a driver of the vehicle, the pressing force being a force for pressing a friction member (MSB) against a rotary member (KTB) that rotates integrally with a wheel (WHL) of the vehicle; a pressing force sensor (FBA) configured to detect the pressing force (Fba); and a circuit board (KBN) configured to implement a microprocessor (MPR) and a bridge circuit (BRG) so as to drive the electric motor (MTR) based on the pressing force (Fba).

In the electric braking device for a vehicle according to the present invention, an end face (Mfb) of the pressing force sensor (FBA) is fixed to contact the circuit board (KBN). By having the pressing force sensor (FBA) arranged as above, a size of the electric motor MTR along the rotation axis Jmt direction (which is a same direction as a rotation axis Jps of a converting mechanism (HNK) is reduced, and the mountability of the electric braking device to the vehicle is improved. Further, fixation of the circuit board KBN to a caliper CRP becomes stronger, and vibration durability of the electric braking device can be improved.

DESCRIPTION OF EMBODIMENTS

Hereinbelow, an electric braking device for a vehicle according to an embodiment of the present invention will be described with reference to the drawings.

<Overall Configuration of Electric Braking Device for Vehicle according to an Embodiment of the Present Invention>

Figure 1:
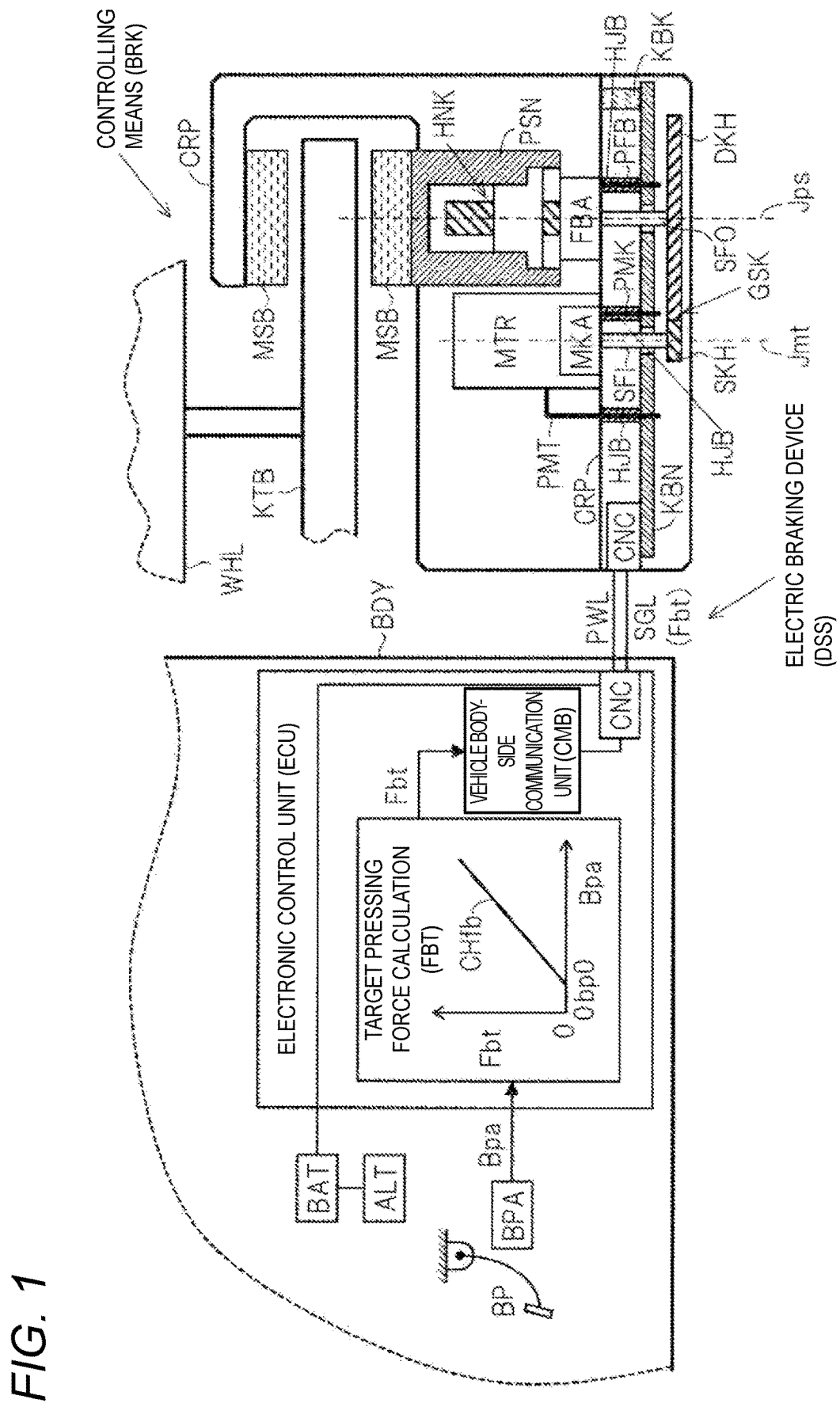
FIG. 1 An overall configuration diagram of an electric braking device for a vehicle according to an embodiment of the present invention.

An electric braking device DSS according to an embodiment of the present invention will be described with reference to an overall configuration diagram of FIG. 1. A vehicle is provided with the electric braking device DSS, a braking operation member BP, an operation amount acquiring means BPA, a rotary member (for example, a brake disk or a brake drum) KTB, and friction members (for example, brake pads or brake shoes) MSB. The electric braking device DSS is configured of an electronic control unit ECU, a communication line SGL, power lines PWL, and a braking means BRK.

The braking operation member (for example, a brake pedal) BP is a member that a driver operates to decelerate the vehicle. Braking torque of a wheel WHL is adjusted by the braking means BRK according to the operation of the braking operation member BP. As a result, a braking force is generated in the wheel WHL, and the running vehicle is thereby decelerated.

The braking operation member BP is provided with the operation amount acquiring means BPA. The operation amount acquiring means BPA allows an operation amount (braking operation amount) Bpa of the braking operation member BP to be acquired (detected). As the operation amount acquiring means BPA, at least one of a sensor (pressure sensor) that detects a pressure of a master cylinder, a sensor (pedaling sensor) that detects an operation force on the braking operation member BP, and a sensor (stroke sensor) that detects an operation displacement of the braking operation member BP is employed. Thus, the braking operation amount Bpa is calculated based on at least one of the master cylinder pressure, the brake pedaling force, and the brake pedal stroke. The detected braking operation amount Bpa is input to the electronic control unit ECU.

<<Electronic Control Unit ECU>>

The electronic control unit ECU is configured of a target pressing force calculation block FBT, a vehicle body-side communication unit CMB, and a connector CNC. The electronic control unit ECU corresponds to a part of a control means (controller) CTL.

In the target pressing force calculation block FBT, a target value (target pressing force) Fbt related to a force by which the friction members MSB press the rotary member KTB (pressing force) is calculated. Specifically, the target pressing force Fbt is calculated based on the braking operation amount Bpa and a preset calculation map CHfb so that the target pressing force Fbt exhibits a monotonic increase from zero as the braking operation amount Bpa increases.

The target pressing force Fbt is inputted to the vehicle body-side communication unit CMB. Signals (Fbt, etc.) are inputted to the circuit board KBN in the braking means BRK (especially to a wheel-side communication unit CMW) by the vehicle body-side communication unit CMB via the communication line SGL and the connector CNC. The communication line SGL connected by the connector CNC is a communication means between the electronic control unit ECU fixed to a vehicle body and the braking means BRK fixed to the wheel. A serial communication bus (for example, a CAN bus) may be used as the signal line SGL. Further, power lines PWL are connected to the connector CNC. Electricity is supplied to the braking means BRK from the electronic control unit ECU by the power lines PWL.

<<Braking Means (Brake Actuator) BRK>>

The braking means BRK is provided on the wheel WHL, and is configured to apply braking torque to the wheel WHL to generate a braking force. The running vehicle is decelerated by the braking means BRK. As the braking means BRK, a configuration of a so-called disk-type braking device (disk brake) is exemplified. In this case, the friction members MSB are brake pads and the rotary member KTB is a brake disk. The braking means BRK may be a drum type braking device (drum brake). In a case of the drum brake, the friction members MSB are brake shoes and the rotary member KTB is a brake drum.

The braking means BRK (brake actuator) is configured of a brake caliper CRP, a pressing member PSN, an electric motor MTR, a rotation angle sensor MKA, a reduction gear GSK, an input member (input shaft) SFI, an output member (output shaft) SFO, a power converting mechanism HNK, a pressing force sensor FBA, and a driving circuit board KBN. The respective members as above (PSN and the like) are accommodated inside the brake caliper CRP.

As the brake caliper CRP (which may simply be termed a caliper), a floating type caliper may be employed. The caliper CRP is configured to interpose the rotary member (brake disk) KTB between two friction members (brake pads) MSB. The pressing member (brake piston) PSN is moved (frontward or rearward) relative to the rotary member KTB in the caliper CRP. Movement of the pressing member PSN presses the friction members MSB against the rotary member KTB, and a friction force is thereby generated. A part of the caliper CRP is configured by a box-shaped structure. Specifically, the caliper CRP includes a space (space) therein, and respective members (circuit board KBN, etc.) are accommodated in this space.

The movement of the pressing member PSN is performed by power from the electric motor MTR. Specifically, an output of the electric motor MTR (rotary power about the rotary axis) is transmitted from the input member (input shaft) SFI to the output member (output shaft) SFO via the reduction gear GSK. Then, rotary power (torque) of the output member SFO is converted to linear power (thrust force in an axial direction of the pressing member PSN) by the power converting mechanism HNK (for example, screw mechanism), and transmitted to the pressing member PSN. As a result, the pressing member PSN is thereby moved relative to the rotary member KTB. The movement of the pressing member PSN adjusts a force (pressing force) by which the friction members MSB press the rotary member KTB. Since the rotary member KTB is fixed to the wheel WHL, the friction force is generated between the friction members MSB and the rotary member KTB, and a braking force for the wheel WHL is thereby adjusted.

The electric motor MTR is a power source for driving (moving) the pressing member (piston) PSN. For example, as the electric motor MTR, a motor with brush, or a brushless motor may be employed. In rotation directions of the electric motor MTR, a forward direction corresponds to a direction along which the friction members MSB approach the rotary member KTB (direction by which the pressing force increases and the braking torque increases), and a reverse direction corresponds to a direction along which the friction members MSB separate away from the rotary member KTB (direction by which the pressing force decreases and the braking torque decreases).

The rotation angle sensor MKA acquires (detects) a position (rotation angle) Mka of a rotor (rotor) of the electric motor MTR. The rotation angle sensor MKA is surface mounted to the circuit board KBN. Further, the detected rotation angle (detected value) Mka is inputted to the circuit board KBN.

The pressing force sensor FBA acquires (detects) a force (pressing force) Fba by which the pressing member PSN presses the friction members MSB. The detected pressing force (detected value) Fba is inputted to the circuit board KBN via pressing force pins PFB. For example, the pressing force sensor FBA is provided between the power converting mechanism HNK and the caliper CRP in the output member SFO.

The driving circuit board (which may simply be termed a circuit board) KBN is an electric circuit configured to drive the electric motor MTR. The circuit board KBN is configured of hardware components such as a microprocessor (which is a calculation processing device, which may simply be termed a processor) MPR and a bridge circuit BRG and control algorithms (software) programmed in the microprocessor MPR. The electric motor MTR and the circuit board KBN are electrically connected via motor pins PMT. The circuit board KBN is fixed to the caliper CRP and is arranged between the electric motor MTR and the reduction gear GSK. The circuit board KBN corresponds to a part of a control means (controller) CTL.

The connector CNC is fixed to the circuit board KBN. Output torque (rotary power) of the electric motor MTR is controlled based on the target pressing force Fbt sent from the electronic control unit ECU via the signal line SGL. Further, electricity transmitted from the electronic control unit ECU through the power line PWL is inputted to the circuit board KBN via the connector CNC. This electricity is the power source of the electric motor MTR and is also the power sources for the rotation angle sensor MKA and the pressing force sensor FBA.

<First Embodiment of Driving Circuit Board KBN>

Figure 2:
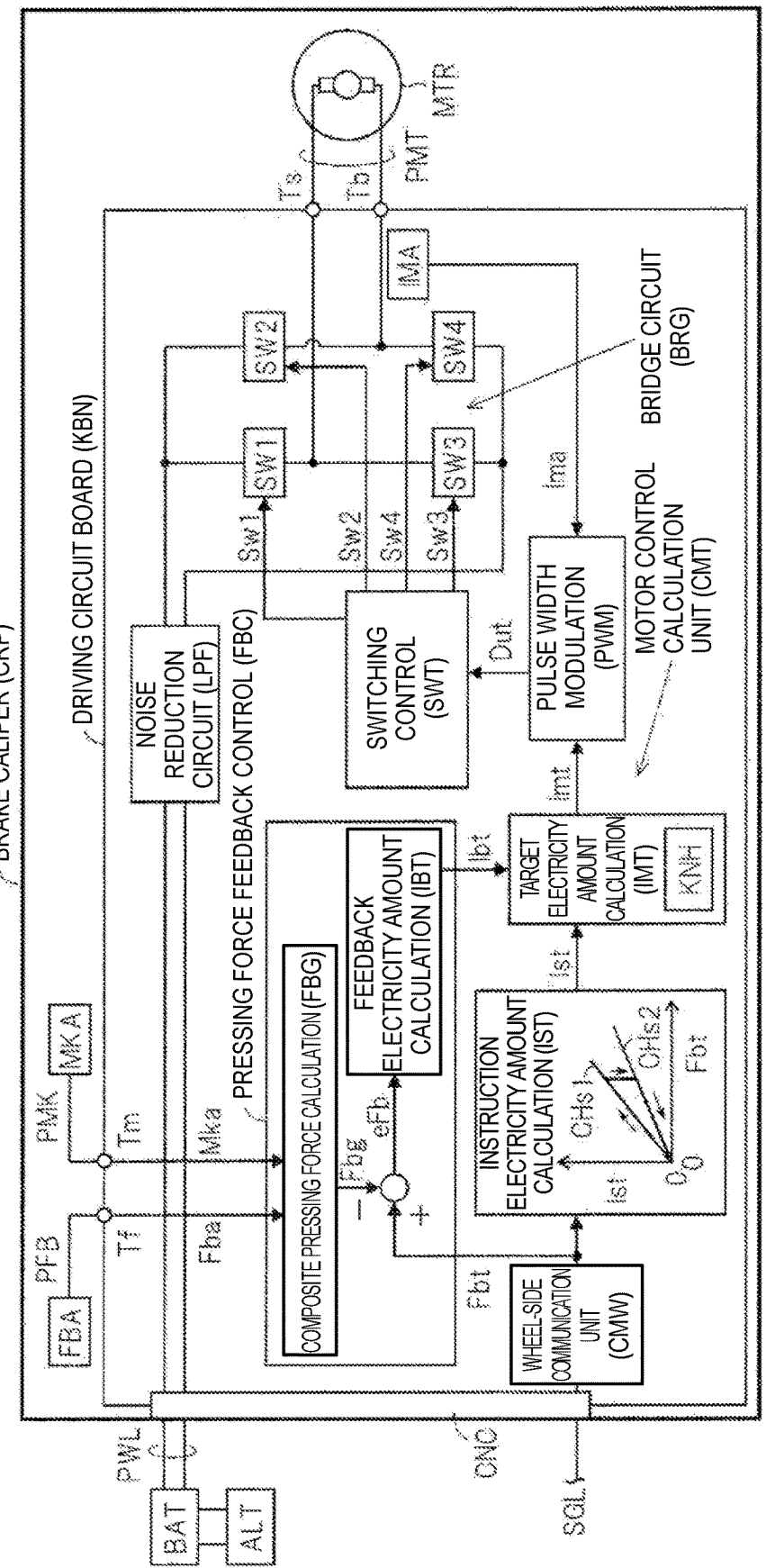
FIG. 2 A schematic diagram for explaining a first embodiment of a driving circuit board.

A first embodiment of the driving circuit board (which may simply be termed the circuit board) KBN will be described with reference to a schematic diagram of FIG. 2. This is an example where a motor with brush (which may simply be termed a brush motor) is employed as the electric motor MTR. The electric motor MTR is driven by the circuit board KBN.

The electric motor (brush motor) MTR is electrically connected to the circuit board KBN by the motor pins PMT. The circuit board KBN is provided with two through holes (through holes) Ts, Tb for the pins PMT, where the two motor pins PMT are press-fitted in the two through holes Ts, Tb, by which the electrically connected state is established. Specifically, as terminals of the motor pins PMT, press-fit connectors (press-fit terminals) are employed.

The acquired result (actual pressing force) Fba of the pressing force sensor FBA is inputted to the circuit board KBN by the pressing force pins PFB. The circuit board KBN is provided with through holes (through holes) Tf for the pressing force pins PFB, where the pins PFB are press-fitted to the through holes Tf and an electric connection state is thereby formed. Specifically, press-fit connectors are employed as the terminals of the pressing force pins PFB.

Here, the "press-fit connector (press-fit terminal)" is an electric connection that does not use solder. The pin terminal (press-fit terminal) is inserted to the through hole (through hole) formed in the circuit board (printed substrate) KBN. Then, electric conduction is realized by an outer circumference of the press-fit terminal and an inner circumference of the through hole contacting each other. That is, a terminal portion (press-fitting portion) of the pin is press-fitted into the printed substrate, and contact electric conduction is realized by an elastic force generated by elastic deformation that takes place thereupon. Due to this, a compliant shape that provides the pin terminal with deformability, and for example, a shape may be employed in which a cutout is formed in the pin terminal and warping is generated at this cutout.

The rotation angle sensor MKA is surface-mounted to the circuit board KBN. Thus, the acquired result (motor rotation angle) Mka of the rotation angle sensor MKA is inputted directly to the circuit board KBN.

The circuit board KBN is configured of the connector CNC, the wheel-side communication unit CMW, a motor control calculation unit CMT, a bridge circuit BRG, and a noise reduction filter (which may also be termed a noise reduction circuit) LPF. The circuit board KBN is fixed to the caliper CRP.

The circuit board (electric circuit board for driving the motor) KBN has the connector CNC fixed thereto. The connector CNC connects the power line PWL and the signal line SGL between the electronic control unit ECU and the braking means BRK. Power is supplied to the circuit board KBN from a rechargeable battery BAT and a dynamo ALT fixed to the vehicle side through power lines PWL. Further, the target pressing force Fbt is inputted to the circuit board KBN (especially the wheel-side communication unit CMW) from the vehicle body-side electronic control unit ECU (especially the vehicle body-side communication unit CMB) through the signal line (communication bus) SGL.

The wheel-side communication unit CMW of the circuit board KBN is configured to receive the target value Fbt of the pressing force via the signal line SGL from the vehicle body-side communication unit CMB of the electronic control unit ECU. The wheel-side communication unit CMW is a communication protocol, and is incorporated in the microprocessor (which may simply be termed a processor) MPR implemented on the circuit board KBN.

<<Motor Control Calculation Unit CMT>>

In the motor control calculation unit CMT, the amount of electricity of the electric motor MTR (that is, the output torque of the electric motor MTR) and an electricity application direction (that is, the rotation direction of the electric motor MTR) are controlled to drive the electric motor MTR. The motor control calculation unit CMT is configured of an instruction electricity amount calculation block IST, a pressing force feedback control block FBC, a target electricity amount calculation block IMT, a pulse width modulation block PWM, and a switching control block SWT. The motor control calculation unit CMT is a control algorithm, and is programmed in the processor MPR implemented on the circuit board KBN.

The instruction electricity amount calculation block IST calculates an instruction electricity amount Ist based on the target pressing force Fbt and preset calculation characteristics (calculation map) CHs1, CHs2. The instruction electricity amount Ist is a target value of the amount of electricity supplied to the electric motor MTR to achieve the target pressing force Fbt. Specifically, the instruction electricity amount Ist is calculated such that it increases monotonically as the target pressing force Fbt increases. Here, the calculation map of the instruction electricity amount Ist is configured of two characteristics CHs1, CHs2 by considering hysteresis of the braking means BRK.

Here, the "amount of electricity" is a state quantity (variable) for controlling the output torque of the electric motor MTR. Since the electric motor MTR outputs the torque that is substantially proportional to current, a current target value of the electric motor MTR may be used as the target value of the amount of electricity. Further, since the current increases as a result of increasing a supplied voltage to the electric motor MTR, a supplied voltage value may be used as the target electricity amount. Moreover, since the supplied voltage value may be modulated by a duty ratio in pulse width modulation, this duty ratio may be used as the amount of electricity.

The pressing force feedback control block FBC calculates a pressing force feedback electricity amount (which may simply be termed a feedback electricity amount) Ibt based on the target pressing force (target value) Fbt, the actual pressing force (detected value) Fba, and the motor rotation angle (detected value) Mka. The pressing force feedback control block FBC is configured of a composite pressing force calculation block FBG and a feedback electricity amount calculation block IBT.

In the composite pressing force calculation block FBG, a composite pressing force Fbg is calculated based on the actual pressing force (detected value) Fba and the actual motor rotation angle (detected value) Mka. The composite pressing force Fbg is a value in which the actual value of the pressing force is calculated at a higher precision than the detected value Fba. A calculation method in the composite pressing force calculation block FBG will be described later.

Next, in the pressing force feedback control block FBC, a deviation (pressing force deviation) eFb (=Fbt−Fbg) between the target pressing force Fbt and the composite pressing force Fbg is calculated. The pressing force feedback electricity amount Ibt is calculated in the feedback electricity amount calculation block IBT within the pressing force feedback control block FBC based on the pressing force deviation eFb so that the target value Fbt and the composite value (actual value) Fbg of the pressing force match each other.

Specifically, a proportional gain (predetermined value) Kp is multiplied to the pressing force deviation eFb to determine a proportional term of the feedback electricity amount Ibt. Further, a derivative value of the pressing force deviation eFb is calculated, to which a derivative gain (predetermined value) Kd is multiplied, and a derivative term of the feedback electricity amount Ibt is thereby calculated. Further, an integrated value of the pressing force deviation eFb is calculated, to which an integration gain (predetermined value) Ki is multiplied, and an integration term of the feedback electricity amount Ibt is thereby calculated. Then, the proportional term, the derivative term, and the integration term of the feedback electricity amount Ibt are added to determine a finalized feedback electricity amount Ibt. That is, in the pressing force feedback control block FBC, a so-called feedback control based on the pressing force (PID control) is executed and the feedback electricity amount Ibt is determined thereby.

In the target electricity amount calculation block IMT, a target electricity amount Imt, which is a finalized target value for the electric motor MTR, is calculated. The instruction electricity amount Ist is calculated as a value corresponding to the target pressing force Fbt; however, a difference may be generated between the target pressing force Fbt and the actual pressing force due to changes in efficiency of a power transmission member of the braking means BRK. Therefore, the target electricity amount Imt is determined such that the instruction electricity amount Ist is adjusted by the feedback electricity amount Ibt to decrease the aforementioned difference. Specifically, the target electricity amount Imt is calculated by adding the feedback electricity amount Ibt to the instruction electricity amount Ist.

The rotation direction of the electric motor MTR is determined according to a sign of the target electricity amount Imt (the value thereof being positive or negative), and the output (rotational force) of the electric motor MTR is controlled based on a magnitude of the target electricity amount Imt. For example, in a case where the sign of the target electricity amount Imt is a positive sign (Imt>0), the electric motor MTR is driven in the forward direction (pressing force increasing direction), and in a case where the sign of the target electricity amount Imt is a negative sign (Imt<0), the electric motor MTR is driven in the reverse direction (pressing force decreasing direction). Further, the output torque of the electric motor MTR is controlled to be larger when an absolute value of the target electricity amount Imt is larger, and the output torque is controlled to be smaller when the absolute value of the target electricity amount Imt is smaller.

In the pulse width modulation block PWM, an instruction value (target value) Dut for performing the pulse width modulation is calculated based on the target electricity amount Imt. Specifically, in the pulse width modulation block PWM, a pulse width duty ratio Dut (rate of the on-state within a cycle in periodic pulse waves) is determined based on the target electricity amount Imt and a preset characteristic (calculation map). Together with the above, in the pulse width modulation block PWM, the rotation direction of the electric motor MTR is determined based on the sign of the target electricity amount Imt (the positive sign or the negative sign). For example, the rotation direction of the electric motor MTR is set such that the forward direction is a positive (plus) value and the reverse direction is a negative (minus) value. Since a finalized output voltage is determined according to an input voltage (power source voltage) and the duty ratio Dut, the rotation direction of the electric motor MTR and the amount of electricity supplied to the electric motor MTR (that is, the output of the electric motor MTR) are determined in the pulse width modulation block PWM.

Moreover, in the pulse width modulation block PWM, a so-called current feedback control is executed. The detected value (for example, the actual current value) Ima of the electricity amount acquiring means IMA is input to the pulse width modulation block PWM, and the duty ratio Dut is corrected (slightly adjusted) based on a deviation (electricity amount deviation) eIm between the target electricity amount Imt and the actual electricity amount Ima. The target value Imt and the actual value Ima are controlled to match each other in this current feedback control, by which a highly accurate motor control can be achieved.

In the switching control block SVVT, signals (driving signals) Sw1 to Sw4 for driving switching elements SW1 to SW4 configuring the bridge circuit BRG are determined based on the duty ratio (target value) Dut. The driving signals Sw1 to Sw4 are determined such that an electricity application time per unit time becomes longer for larger duty ratios Dut, and larger current is thereby flown in the electric motor MTR. By these driving signals Sw1 to Sw4, electricity application/nonapplication and the electricity application time per unit time in each of the switching elements SW1 to SW4 are controlled. That is, the rotation direction and the output torque of the electric motor MTR are controlled by the driving signals Sw1 to Sw4. As above, the motor control calculation unit CMT has been described.

The bridge circuit BRG is a circuit that does not require bidirectional power sources, and by which the electricity application direction to the electric motor is changed by a single power source, and the rotation direction (the forward direction or the reverse direction) of the electric motor can thereby be controlled. The bridge circuit BRG is configured of the switching elements SW1 to SW4, and is implemented on the circuit board KBN. The switching elements SW1 to SW4 are elements that can turn on (apply electricity to) or turn off (not apply electricity to) a part of an electric circuit. For example, MOS-FETs and IGBTs may be used as the switching elements SW1 to SW4.

In the case where the electric motor MTR is driven in the forward direction, the switching elements SW1, SW4 are brought to the electricity applied state (on-state) and the switching elements SW2, SW3 are brought to the electricity nonapplied state (off-state). To the contrary, in the case where the electric motor MTR is driven in the reverse direction, the switching elements SW1, SW4 are brought to the electricity nonapplied state (off-state) and the switching elements SW2, SW3 are brought to the electricity applied state (on-state). That is, in a reverse drive of the electric motor MTR, the current is flown in a direction opposite to that for a forward drive.

The electricity amount acquiring means (for example, a current sensor) IMA for the electric motor is provided in the bridge circuit BRG. The electricity amount acquiring means IMA acquires the amount of electricity (actual value) Ima of the electric motor MTR. For example, a value of the current actually flowing in the electric motor MTR may be detected as the actual electricity amount Ima by the motor current sensor IMA.

The noise reduction filter (which may also be termed the noise reduction circuit) LPF is implemented on the circuit board KBN for stabilizing supplied electricity. The noise reduction circuit LPF is configured by combining at least one condenser (capacitor) and at least one inductor (coil). The noise reduction circuit LPF is a stabilizer circuit for reducing voltage fluctuation and the like, and is a so-called LC circuit (which may also be termed an LC filter).

<Composite Pressing Force Calculation Block FBG>

Figure 3:
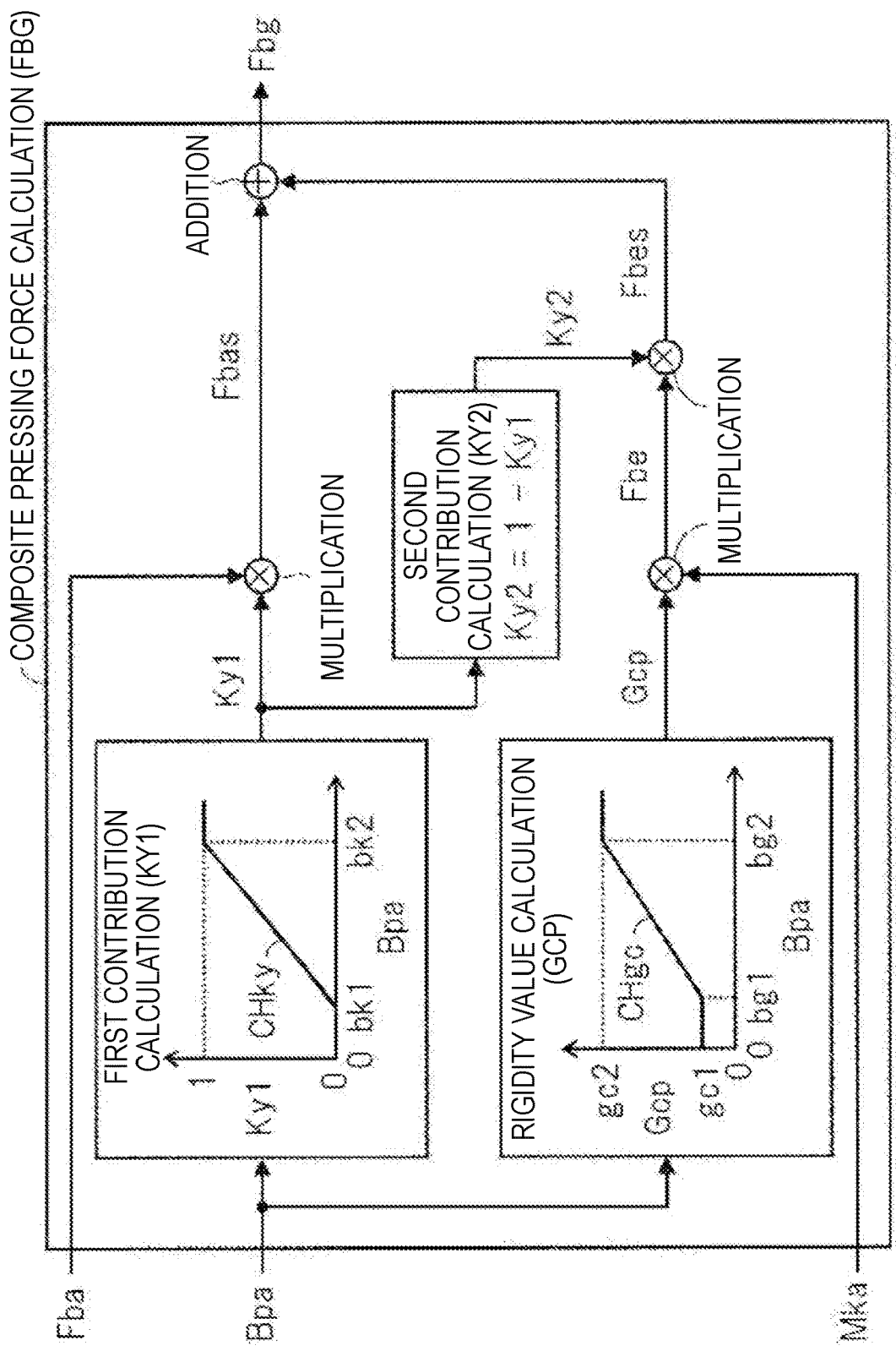
FIG. 3 A functional block diagram for explaining a composite pressing force calculation block.

Details of the composite pressing force calculation block FBG will be described with reference to a functional block diagram of FIG. 3. The composite pressing force calculation block FBG is configured of a first contribution calculation block KY1, a second contribution calculation block KY2, and a rigidity value calculation block GCP. In the composite pressing force calculation block FBG, the composite pressing force (calculation value) Fbg is calculated based on the detected value Fba of the pressing force sensor FBA and the detected value Mka of the rotation angle sensor MKA. Here, the composite pressing force Fbg is the high-precision actual value of the pressing force in which the precision of the detected value Fba is compensated by the detected value Mka.

In the first contribution calculation block KY1, a first contribution Ky1 is calculated based on the braking operation amount Bpa. The first contribution Ky1 is a coefficient that determines a degree of an influence of the detected value Fba of the pressing force sensor FBA in the calculation of the composite pressing force Fbg. The first contribution Ky1 is calculated based on the braking operation amount Bpa and a calculation characteristic (calculation map) CHky. The first contribution Ky1 is calculated as "0" in a case where the operation amount Bpa is less than a predetermined value bk1, and the first contribution Ky1 is increased from "0" to "1" (monotonic increase) in accordance with an increase in the operation amount Bpa in a case where the operation amount Bpa is equal to or greater than the predetermined value bk1 and less than a predetermined value bk2 (>bk1). In a case where the operation amount Bpa is equal to or greater than the predetermined value bk2, the first contribution Ky1 is calculated as "1". Here, the detected pressing force Fba is not used in the calculation of the composite pressing force Fbg in the case of Ky1=0.

In the second contribution calculation block KY2, the second contribution Ky2 is calculated based on the first contribution Ky1. Specifically, the second contribution Ky2 is determined by an equation "Ky2=1−Ky1". Here, in a case of Ky2=0, an estimated pressing force Fbe is not used in the calculation of the composite pressing force Fbg.

In the rigidity value calculation block GCP, a rigidity value Gcp is calculated based on the braking operation amount Bpa. The rigidity value Gcp corresponds to a rigidity (spring constant) of the entire braking means BRK. That is, the rigidity value Gcp represents the spring constant as a serial spring configured of the caliper CRP and the friction members MSB. The rigidity value Gcp is calculated based on the braking operation amount Bpa and rigidity characteristics (calculation map) CHgc. Here, the rigidity characteristics CHgc are characteristics for estimating the rigidity value Gcp based on the operation amount Bpa. In a case where the operation amount Bpa is less than a predetermined value bg1, the rigidity value Gcp is calculated as a predetermined value gc1, and in a case where the operation amount Bpa is equal to or greater than the predetermined value bg1 and less than a predetermined value bg2 (>bg1), the rigidity value Gcp is increased (monotonic increase) from the predetermined value gc1 to a predetermined value gc2 (>gc1) according to the increase in the operation amount Bpa. In a case where the operation amount Bpa is equal to or greater than the predetermined value bg2, the rigidity value Gcp is calculated as a predetermined value gc2.

The estimated value Fbe of the pressing force is calculated based on the rigidity value Gcp and the rotation angle Mka of the electric motor MTR. The pressing force estimated value Fbe is the pressing force estimated from the rotation angle Mka. Specifically, the estimated value Fbe of the pressing force is calculated by multiplying the actual rotation angle Mka of the electric motor MTR to the rigidity value Gcp representing the spring constant of the entire braking means BRK.

A detected value component Fbas being a component of the detected value Fba in the composite pressing force Fbg is calculated based on the pressing force detected value (detected value of the pressing force sensor FBA) Fba and the first contribution Ky1. The detected value component Fbas is a component of the pressing force detected value Fba in which a degree of influence thereof is taken into consideration by the first contribution Ky1. Specifically, it is determined by multiplying the coefficient Ky1 to the pressing force actual value Fba (that is, Fbas=Ky1×Fba).

An estimated value component Fbes being a component of the estimated value Fbe in the composite pressing force Fbg is calculated based on the pressing force estimated value (pressing force estimated based on Mka) Fbe and the second contribution Ky2. The estimated value component Fbes is a component of the pressing force estimated value Fbe in which a degree of influence thereof is taken into consideration by the second contribution Ky2. Specifically, it is determined by multiplying the coefficient Ky2 to the pressing force estimated value Fbe (that is, Fbes=Ky2×Fbe=Ky2×Gcp×Mka).

Further, the component (detected value component) Fbas of the pressing force detected value Fba and the component (estimated value component) Fbes of the pressing force estimated value Fbe are added, and the composite pressing force Fbg is thereby calculated (that is, Fbg=Fbas+Fbes=Ky1×Fba+Ky2×Fbe). That is, the composite pressing force Fbg is the actual value of the pressing force with high precision that is calculated by reflecting the degree of influences of the detected value Fba and the estimated value Fbe according to a magnitude of the operation amount Bpa.

The detected value Fba of the pressing force is obtained by an element that detects "distortion (deformation caused upon when a force is applied)" (distortion detecting element). Generally, an analog signal is sent from the distortion detecting element, which is subjected to analog-digital conversion (AD conversion) and taken into the processor MPR. Since the detected value Fba is inputted to the processor MPR through analog-digital converting means ADH, a resolution (resolving power) of the pressing force detection is dependent on a performance (resolution) of the AD conversion. On the other hand, the actual position (rotation angle) of the electric motor is taken into the processor MPR as a digital signal from a Hall IC or a resolver. Further, the output of the electric motor is decelerated by the reduction gear GSK and the like and is converted to the pressing force. Due to this, the pressing force estimated value Fbe calculated from the rotation angle Mka of the electric motor MTR as acquired by the rotation angle sensor MKA has a higher pressing power resolution (resolving power) than the pressing force detected value Fba acquired by the pressing force acquiring means FBA. On the other hand, the pressing force estimated value Fbe is calculated based on the rigidity (spring constant) Gcp of the actuator BRK. Since the rigidity value Gcp varies depending on a state of wear in the friction members MSB, the pressing force detected value Fba has a higher reliability than the pressing force estimated value Fbe (its error from a true value is smaller).

Further, the characteristics of the pressing force Fba relative to the position Mka of the electric motor (that is, a change in the spring constant of the entire braking device) are nonlinear, and exhibit a shape that "protrudes downward". Due to this, in a region where the pressing force is large, pressing force detection sensitivity (amount of change in the pressing force according to displacement) is sufficiently high, so the pressing force detected value Fba can be used in the pressing force feedback control. However, in a region where the pressing force is small, the detection sensitivity of the pressing force detected value Fba becomes lower, so it is preferable to employ the pressing force estimated value Fbe in addition to (or as a substitution of) the pressing force detected value Fba in the pressing force feedback control.

According to the above findings, the first contribution Ky1 is calculated as a relatively small value and the second contribution Ky2 is calculated as a relatively large value in the case where the braking operation amount Bpa is small. As a result, in the region where the pressing force is small, where a fine braking torque adjustment is required (that is, a region where the braking operation amount is small and the braking toque is small), the resolution (the least significant bit, LSB thereof) of the detection of the generating pressing force is improved, and precise pressing force feedback control can be executed. Further, in the case where the braking operation amount Bpa is large, the first contribution Ky1 is calculated as a relatively large value and the second contribution Ky2 is calculated as a relatively small value, by which the degree of the influence of the pressing force estimated value Fbe estimated from the rotation angle Mka is reduced and the degree of the influence of the actually-detected pressing force detected value Fba is increased. As a result, in the region where the pressing force is large, where a relationship of the vehicle deceleration relative to the braking operation amount Bpa is required to be constant (that is, in the region where the braking operation amount is large and the braking torque is large), the highly reliable pressing force feedback control (that is, based on the pressing force with small error from the true value) can be executed.

Furthermore, in the case where the braking operation amount Bpa is smaller than the predetermined operation amount (predetermined value) bk1, the first contribution Ky1 may be set to zero. Further, in the case where the braking operation amount Bpa is greater than the predetermined operation amount (predetermined value) bk2, the second contribution Ky2 is calculated to zero. Thus, the resolution of the pressing force feedback control in the region where the operation amount Bpa is small (braking torque is small) can be improved, and the reliability of the pressing force feedback control in the region where the operation amount Bpa is large (braking torque is large) can be improved.

<Second Embodiment of Driving Circuit Board KBN>

Figure 4:
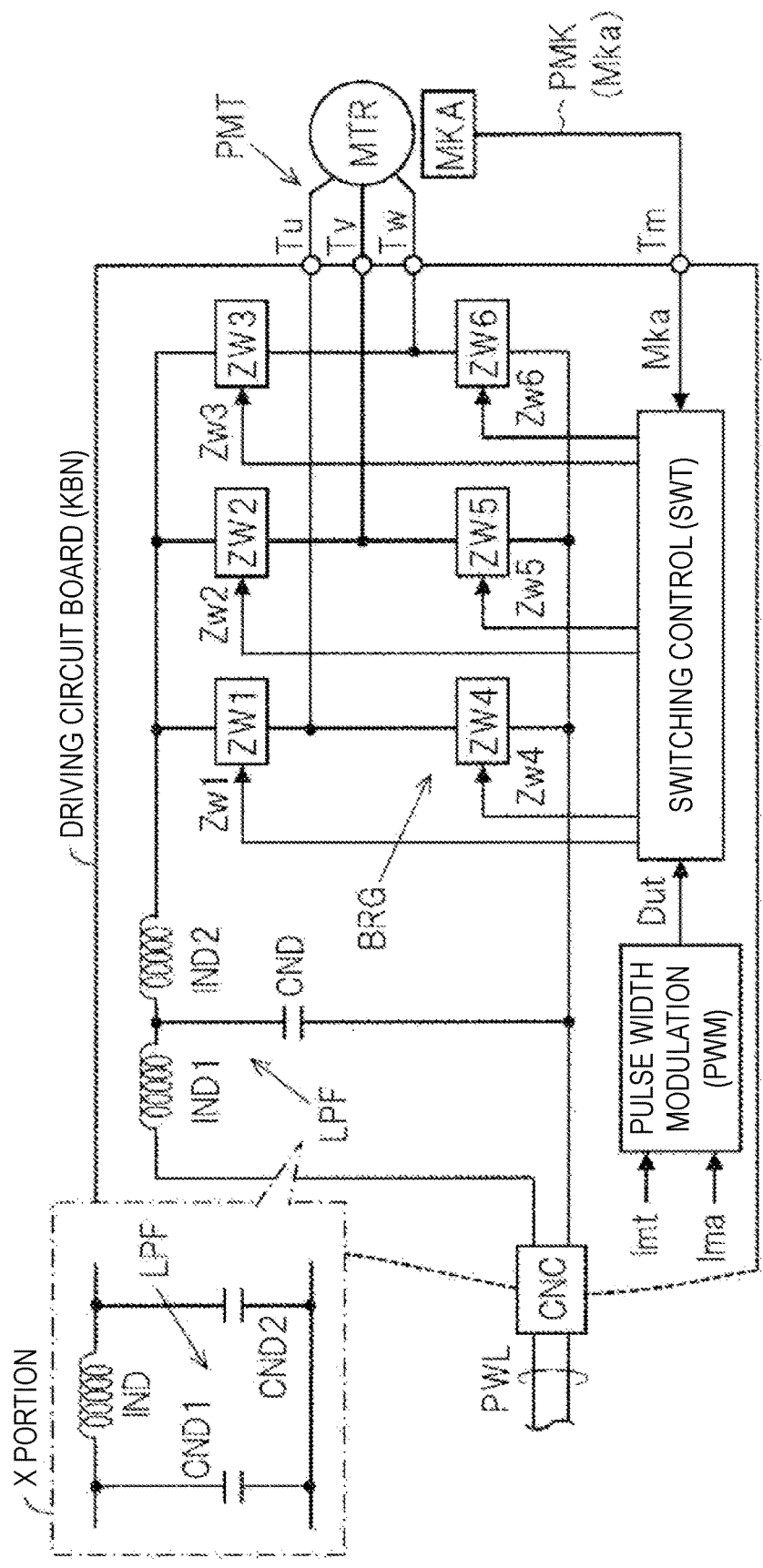
FIG. 4 A schematic diagram for explaining a second embodiment of a driving circuit board.

A second embodiment of the driving circuit board KBN will be described with reference to a schematic diagram of FIG. 4. This is an example where a brushless DC motor (three-phase brushless motor, which may simply be termed a brushless motor) is employed as the electric motor MTR. In this case, the bridge circuit BRG is configured of six switching elements ZW1 to ZW6. Here, the wheel-side communication unit CMW and the motor control calculation unit CMT are identical to the case of the brush motor, so descriptions thereof are omitted.

In the brushless motor MTR, commutation of the current is performed by the electric circuit instead of a mechanical rectifier of the brush motor. In a structure of the brushless motor MTR, a rotor (rotor) serves as a permanent magnet, and a stator (stator) serves as a coil circuit (electromagnet). Further, the rotation position (rotation angle) Mka of the rotor is detected, and the switching elements ZW1 to ZW6 are switched according to the rotation angle Mka so that the supplied current is commutated. The position of the rotor of the brushless motor MTR (rotation angle) Mka is detected by the rotation angle sensor MKA. The bridge circuit BRG configured of the switching elements ZW1 to ZW6 is implemented by the driving circuit board KBN fixed to the caliper CRP.

The connector CNC is fixed to the circuit board KBN. The signal Fbt and the electricity supplied by the signal line SGL and the power line PWL are inputted to the circuit board KBN through the connector CNC from the electronic control unit ECU provided on the vehicle body side.

Similar to the case with the brush motor, the duty ratio (target value) Dut is calculated based on the target value Imt and the actual value Ima of the electricity amount in the pulse width modulation block PWM so as to perform the pulse width modulation. Further, the duty ratio Dut of the pulse width is determined in the pulse width modulation block PWM based on the magnitude (absolute value) of the target electricity amount Imt and the rotation direction of the electric motor MTR is determined based on the sign of the target electricity amount Imt (the value thereof being positive or negative).

Further, in the switching control block SWT, driving signals Zw1 to Zw6 for controlling a state of electric conduction/nonconduction of the switching elements ZW1 to ZW6 are calculated based on the duty ratio Dut. Here, in the brushless motor, the rotor position (rotation angle) Mka of the electric motor MTR is acquired by the rotation angle sensor MKA, based in which the signals Zw1 to Zw6 for driving the six switching elements ZW1 to ZW6 configuring the three-phase bridge circuit BRG are determined. The switching elements ZW1 to ZW6 sequentially switch directions of U-phase, V-phase, and W-phase coil electricity amounts (that is, a magnetizing direction) of the electric motor MTR, and the electric motor MTR is thereby driven. A rotation direction (forward or reverse direction) of the brushless motor MTR is determined by the relation between a position where magnetic excitation is caused and the rotor.

Similarly, of the rotation direction of the electric motor MTR, the forward direction is a rotation direction which brings the friction members MSB and the rotary member KTB closer to each other, the braking torque is increased and a degree of deceleration of the running vehicle is increased, whereas the reverse direction is a rotation direction which separates the friction members MSB away from the rotary member KTB, the braking torque is decreased, and the degree of deceleration of the running vehicle is decreased.

U-phase, V-phase, and W-phase coils of the brushless motor MTR are respectively connected electrically to the circuit board KBN (especially the through holes Tu, Tv, Tw) by the three motor pins PMT. Here, the motor pins PMT are press-fit connectors. Further, the rotation angle sensor MKA is electrically connected by being surface mounted on the circuit board KBN.

In order to stabilize the supplied electricity, the circuit board KBN is provided a filter circuit (being an LC circuit, which is also called an LC filter) for noise reduction (reduction of electricity variation) formed by a combination of at least one condenser (capacitor) and at least one inductor (coil).

For example, a capacitor CND and first and second inductors IND1, IND2 are implemented on the circuit board KBN. These are combined to form a low pass filter (T-type filter) LPF, by which the noise reduction can be executed. Specifically, the T-type noise reduction circuit LPF is configured of the two serial inductors IND1, IND2 and one parallel capacitor CND, by which a harmonics attenuation performance (attenuated amount in an attenuation range) can be improved.

Further, as indicated by a balloon block of a portion X, first and second capacitors CND1, CND2 and the inductor IND may be implemented on the circuit board KBN, by which a π-type low pass filter (noise reduction filter) LPF may be formed. Specifically, the π-type low pass filter LPF is configured of two capacitors CND1, CND2 parallel to a line and one serial inductor. Generally, a capacitor (capacitor) is cheaper than an inductor, so the employment of the Tr-type noise reduction circuit LPF suppresses component cost, and a satisfactory noise reduction effect can be achieved.

<Arrangement of Rotation Angle Sensor MKA and Pressing Force Sensor FBA in Vertical Direction View relative to Rotation Axis Jmt of Electric Motor>

Figure 5:
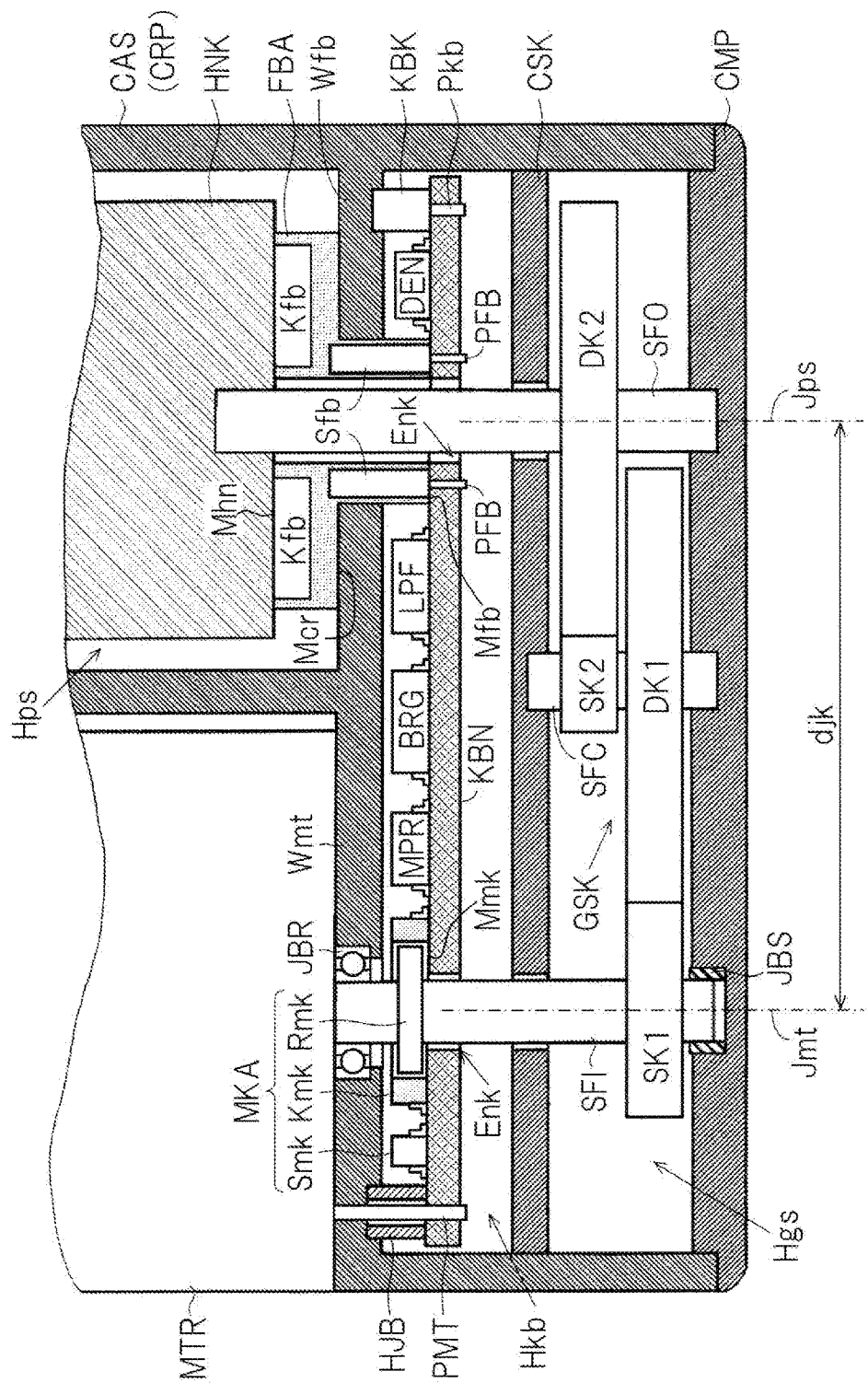
FIG. 5 A partial cross-sectional diagram for explaining a positional relationship of a rotation angle sensor, a pressing force sensor, and a driving circuit board as seen along a vertical direction relative to a rotation axis of an electric motor.

Attachment of the rotation angle sensor MKA and the pressing force sensor FBA to the circuit board KBN will be described with reference to a partial cross-sectional diagram of FIG. 5. Specifically, attaching arrangements of the rotation angle sensor MKA, the pressing force sensor FBA, and the circuit board KBN in a view along a direction vertical to the rotation axis Jmt of the electric motor MTR will be described. Here, the rotation axis Jmt of the electric motor MTR and a rotation axis Jps of the power converting mechanism (which may simply be termed a converting mechanism) HNK are not coaxial, but are parallel and separated by a predetermined distance djk. That is, a so-called dual axis configuration in which the reduction gear GSK has two rotation axes, namely the rotation axis Jmt of the input shaft and the rotation axis Jps of the output shaft, is employed as the braking means BRK.

Other than the members (portions) to interposingly hold the rotary member KTB by the friction members MSB, the caliper CRP includes a member (portion) to arrange the electric motor MTR and the like. A member of the caliper CRP in which the electric motor MTR and the like is provided is a casing member CAS. The casing member CAS of the caliper CRP is provided with two spaces (spaces). One space is for housing the converting mechanism HNK, the pressing member PSN, and the like. This space will be termed a "pressing chamber Hps".

The electric motor MTR is fixed to an attachment wall Wmt of the casing member CAS (which is a part of the caliper CRP) via a sealing member (not shown). The input shaft SFI is fixed to the output shaft of the electric motor MTR so as to rotate together with the rotor of the electric motor MTR. The attachment wall Wmt of the casing member CAS is provided with a through hole for the input shaft SFI.

The other space is provided on an opposite side of the pressing chamber Hps with respect to the attachment wall Wmt of the casing member CAS. The circuit board KBN and the reduction gear GSK are housed herein. This space is closed by a closing member CMP via a sealing member (not shown), and is configured in a sealed state for water and dust prevention.

The space formed by the casing member CAS and the closing member CMP is partitioned into two by a partitioning member CSK (partition plate). Of the space in the casing member CAS partitioned into two, the circuit board KBN is fixed in the space on a closer side to the electric motor MTR relative to the partitioning member CSK. Further, the reduction gear GSK is provided in the space on a farther side from the electric motor MTR relative to the partitioning member CSK. The space where the circuit board KBN is housed is termed a "substrate chamber Hkb", and the space where the reduction gear GSK is housed is termed a "reduction chamber Hgs". In other words, the partitioning member CSK is a member that defines the substrate chamber Hkb and the reduction chamber Hgs. Lubricant such as grease is applied to the reduction gear GSK for lubrication, and the circuit board KBN is surrounded by the partitioning member CSK so that the lubricant does not contact the circuit board KBN.

The single circuit board KBN is fixed to the casing member CAS in the substrate chamber Hkb by fixation members KBK each having a round columnar shape. Specifically, one end surfaces of the fixation members KBK are fixed to the attachment wall Wmt and a pressing wall Wfb of the casing member CAS. Further, the circuit board KBN is fixed to the fixation members KBK by fixation pins (press-fit pins) Pkb on the other end faces of the fixation members KBK, where the circuit board KBN is fixed such that its surface (flat face where the processor MPR, the bridge circuit BRG, etc. are implement) becomes vertical to the rotation axis Jmt of the electric motor MTR.

The reduction gear GSK is supported in the reduction chamber Hgs in a state of being rotatable relative to the casing member CAS and the closing member CMP. Specifically, the input shaft SFI penetrates the circuit board KBN and the partitioning member CSK, and extends to the reduction chamber Hgs. The input shaft SFI (that is, the output shaft of the electric motor MTR) is rotatably supported by the attachment wall Wmt of the casing member CAS via a bearing JBR and is rotatably supported on the closing member CMP via a bearing JBS. Similarly, an intermediate shaft SFC and the output shaft SFO are supported in states of being rotatable relative to the casing member CAS and the closing member CMP by bearings JBR and bushes JBS not shown. Further, gears SK1, DK1, SK2, and DK2 fixed to the input shaft SFI, the intermediate shaft SFC, and the output shaft SFO configure the reduction gear GSK.

Within the reduction chamber Hgs, a first small diameter gear SK1 that rotates integrally with the input shaft SFI is fixed to the input shaft SFI. That is, the rotation shaft of the electric motor MTR and the input shaft of the reduction gear GSK have a same axis line (coaxial). A first large diameter gear DK1 is engaged with the first small diameter gear SK1. Here, a number of teeth of the first large diameter gear DK1 is greater than a number of teeth of the first small diameter gear SK1. Thus, a combination of the first small diameter gear SK1 and the first large diameter gear DK1 decelerates rotation motion of the input shaft SFI, and torque of the input shaft SFI is thereby increased.

The first large diameter gear DK1 is fixed to the intermediate shaft SFC. Further, the intermediate shaft SFC has a second small diameter gear SK2 fixed thereto. That is, the first large diameter gear DK1 and the second small diameter gear SK2 rotate integrally. The second small diameter gear SK2 has a second large diameter gear DK2 engaged therewith. Here, a number of teeth of the second large diameter gear DK2 is greater than a number of teeth of the second small diameter gear SK2. Thus, a combination of the second small diameter gear SK2 and the second large diameter gear DK2 decelerates rotation motion of the intermediate shaft SFC, and torque of the intermediate shaft SFC is thereby increased.

The second large diameter gear DK2 is fixed to the output shaft SFO. The output shaft SFO rotates integrally with the second large diameter gear DK2, and transmits rotary power thereof to the converting mechanism HNK. Thus, the output shaft of the reduction gear GSK and an input of the converting mechanism HNK have a same axis line (coaxial). The reduction gear GSK is configured of the first small diameter gear SK1, the first large diameter gear DK1, the second small diameter gear SK2, and the second large diameter gear DK2. In other words, the reduction gear GSK executes two-step deceleration. The reduction gear GSK decelerates the rotary power of the electric motor MTR (that is, the torque of the input shaft SFI being the output torque of the electric motor MTR is increased) and is transmitted to the output shaft SFO. The output shaft SFO penetrates the partitioning member CSK, the circuit board KBN (especially a round hole Enk), and the pressing force sensor FBA and is connected to the converting mechanism HNK. The rotary power of the output shaft SFO is transmitted to the power converting mechanism HNK (for example a screw mechanism). As above, a power transmission passage through which the rotary power of the electric motor MTR is transmitted to the converting mechanism HNK through the reduction gear GSK was described.

<<Rotation Angle Sensor MKA>>

The rotation angle sensor MKA is configured of a rotation unit Rmk, a detection unit Kmk, and a process unit Smk. The rotation unit Rmk of the rotation angle sensor MKA rotates integrally with the rotor of the electric motor MTR. The rotation unit Rmk is fixed to the input shaft SFI (coaxial to the rotation axis of the electric motor MTR). The detection unit Kmk of the rotation angle sensor MKA detects a position of the rotation unit Rmk (rotation angle). The process unit Smk of the rotation angle sensor MKA signal-processes the detected rotation unit Rmk and outputs the motor rotation angle (detected value) Mka. Here, the detection unit Kmk and the process unit Smk of the rotation angle sensor MKA are implemented on the surface of the circuit board KBN (that is, they are fixed in surface contact with the circuit board KBN). That is, the rotation angle sensor MKA is fixed at its end face Mmk to make contact with the circuit board KBN.

As the rotation angle sensor MKA, a Hall element type may be employed. In this case, the rotation unit Rmk has a round disk-shaped permanent magnet fixed to the input shaft SFI. As the detection unit Kmk, a Hall element is implemented on the circuit board KBN. In such a Hall element type rotation angle sensor, a generated voltage caused by a magnetic field change is small, and an element characteristic change caused by a temperature change is large. Due to this, in the process unit Smk, signal processing such as signal amplification, AD conversion, temperature compensation and the like are performed on a detection result of the detection unit Kmk and the rotation angle detected value Mka is outputted.

Further, as the rotation angle sensor MKA, a variable reluctance type resolver may be employed. In this case, as the rotation unit Rmk, a rotor (rotor) having teeth formed of a high-permeability material is fixed to the input shaft SFI to change gaps in a magnet path. An excitation coil for exciting the rotor and a detection coil would coaxially with the excitation coil are implemented on the circuit board KBN. As the rotation unit Kmt, these coils are fixed on the circuit board KBN. When the electric motor MTR is rotated, the gap between the detection coil and the rotor changes, and a length of the magnetic path thereby changes. The rotation of the rotor is detected as a change in an amplitude of the alternating voltage. In process unit Smk, the change in the voltage amplitude is signal-processed and the rotation angle detected value Mka is calculated.

<<Pressing Force Sensor FBA>>

The pressing force sensor FBA is configured of a detection unit Kfb and a process unit Sfb. The pressing force sensor FBA is interposed between the casing member CAS and the converting mechanism HNK so that the detection unit Kfb of the pressing force sensor FBA can detect the force (pressing force detected value) Fba which the converting mechanism HNK exerts on the caliper CRP (casing member CAS). That is, a pressing surface Mhn of the pressing force sensor FBA is arranged to contact the converting mechanism HNK and a caliper surface Mcr of the pressing force sensor FBA is arranged to contact the pressing wall Wfb of the casing member CAS. A through hole is provided at a center portion of the pressing force sensor FBA, and the output shaft SFO penetrates therethrough. Further, the pressing force sensor FBA is fixed so as to penetrate the pressing wall Wfb of the casing member CAS and abuts (surface contacts) the circuit board KBN. In other words, the pressing force sensor FBA is fixed by the converting mechanism HNK to the pressing wall Wfb of the casing member CAS, so the circuit board KBN is thereby fixed to the caliper CRP by the end face Mfb of the pressing force sensor FBA.

The signal detected by the detection unit Kfb is signal-processed in the process unit Sfb. Similar to the case of the rotation angle sensor MKA, the process unit Sfb performs the signal processing such as signal amplification, AD conversion, temperature compensation and the like on the detection result of the detection unit Kfb and the pressing force detected value Fba is outputted. The process unit Sfb of the pressing force sensor FBA is arranged to abut the circuit board KBN at its end face Mfb and is joined with the circuit board KBN via the pressing force pins PFB. The pressing force pins PFB supply the electricity to the pressing force sensor FBA and transmit the detected signal (pressing force detected value) Fba of the pressing force sensor FBA to the circuit board KBN (eventually to the processor MPR). The pressing force pins PFB include the press-fit terminals, and are press-fitted into the circuit board KBN for contact electric conduction.

«Motor Pins PMT»

The motor pins PMT supply the electricity to the electric motor MTR from the circuit board KBN (especially the bridge circuit BRG) to rotatingly drive the electric motor MTR. The motor pins PMT include the press-fit terminals, are press-fitted to the circuit board KBN, and the contact electric conduction is thereby performed. The casing member CAS is provided with the through holes for the motor pins PMT. The motor pins PMT are electrically connected to the circuit board KBN by penetrating through these holes.

The motor pins PMT are press-fitted to the circuit board KBN via a holding member HJB. The holding member HJB is a cylindrical member having through holes at its center portions (that is, having a penetrating cylinder shape), and is for fixing the circuit board KBN to the casing member CAS. Specifically, the motor pins PMT penetrate through the through holes of the holding member HJB and thereby the terminals of the pins PMT are press-fitted to the circuit board KBN. End faces of the holding member HJB and the pins PMT fix the circuit board KBN to the attachment wall Wmt of the casing member CAS. Here, the holding member HJB may be formed of an insulated body (nonconductive body) such as resin that does not electrically conduct.

As described above, in the case of seeing along the vertical direction to the rotation axis Jmt of the electric motor MTR (in the vertical view of the rotation axis Jmt), the circuit board KBN is arranged between the electric motor MTR and the reduction gear GSK in the arrangement of the electric motor MTR, the circuit board KBN, and the reduction gear GSK. Since the circuit board KBN is provided close to the electric motor MTR, the rotation unit Rmk of the rotation angle sensor MKA is fixed to the input shaft SFI (that is, the rotation axis of the electric motor MTR) and the detection unit Kmk and the process unit Smk of the rotation angle sensor MKA are surface implemented on the substrate at the end face Mmk. That is, the rotation angle sensor MKA is fixed to the circuit board KBN to be in surface contact on the sensor end face Mmk. According to this configurational arrangement, the actuator BRK has a shortened size in the rotation axis Jmt direction and its mountability to the vehicle can be improved.

Since the electric motor MTR is arranged in proximity to the circuit board KBN, the motor pins PMT are press-fitted to the circuit board KBN by penetrating through the holding member HJB and may be used in the fixation of the circuit board KBN. Here, straight pins (pins having a linear longitudinal shape) may be employed as the motor pins PMT. In addition to the fixation members KBK, the holding member HJB and the motor pins PMT also serve to fix the circuit board KBN to the casing member CAS, so the fixation of the circuit board KBN can be configured more securely.

Moreover, as seeing along the vertical direction to the rotation axis Jps of the converting mechanism HNK (same as the vertical view of the rotation axis Jmt), the circuit board KBN is arranged between the converting mechanism HNK and the reduction gear GSK in the arrangement of the converting mechanism HNK, the circuit board KBN, and the reduction gear GSK. The pressing force sensor FBA is provided between the casing member CAS and the converting mechanism HNK, however, since the circuit board KBN and the pressing force sensor FBA are arranged close, the end face Mfb of the pressing force sensor FBA is fixed by the pressing force pins PFB to make surface contact with the circuit board KBN. Similar to the above, according to this configurational arrangement, the actuator BRK has the shortened size in the rotation axis Jps direction and its mountability to the vehicle can be improved. Moreover, in addition to the fixation members KBK, the circuit board KBN is fixed to the casing member CAS further by the pressing force sensor FBA, so the fixation of the circuit board KBN can be configured even more securely.

<Arrangement of Rotation Angle Sensor MKA and Pressing Force Sensor FBA in View Parallel to Rotation Axis Jmt of Electric Motor>

Figure 6:
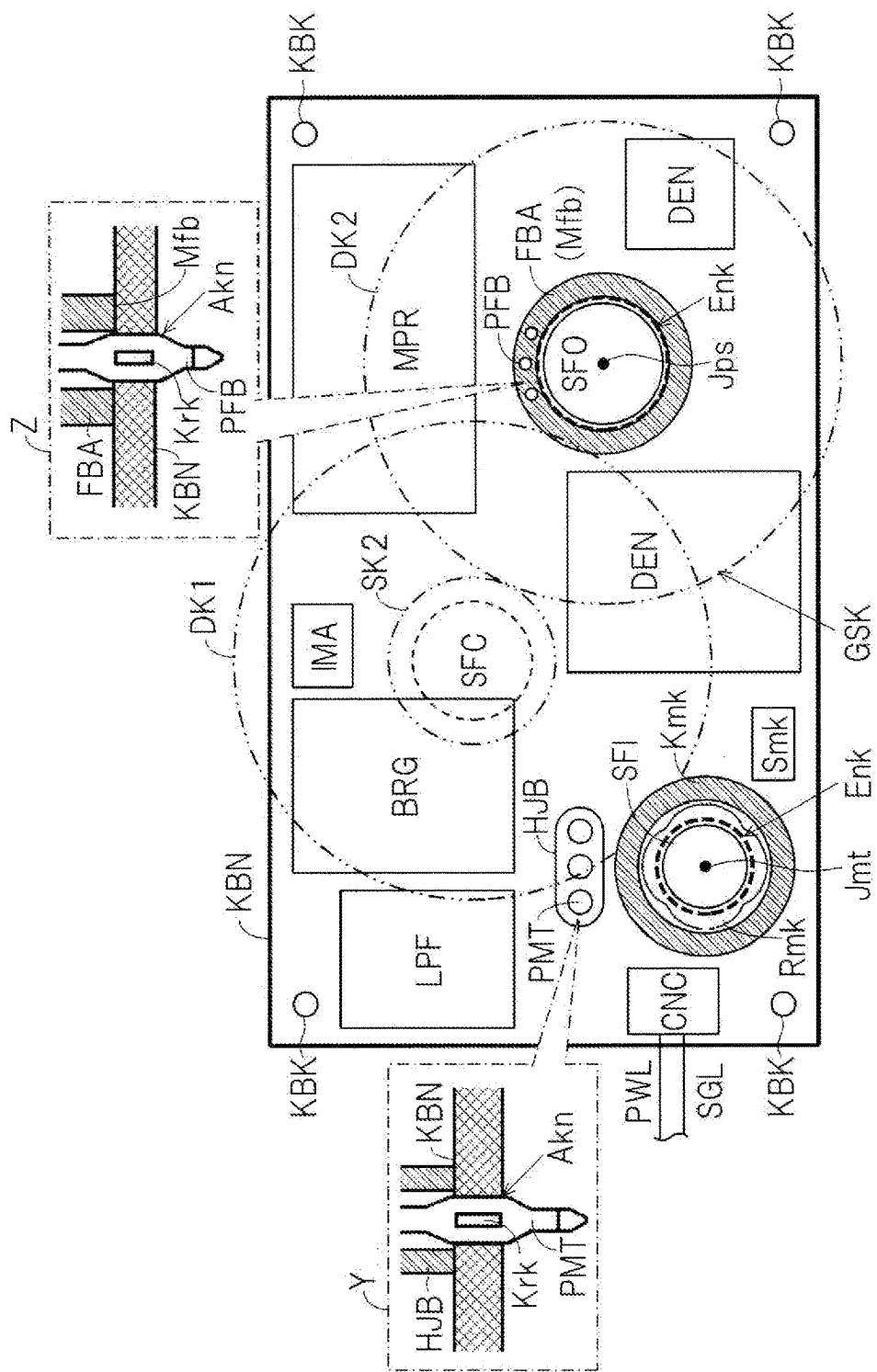
FIG. 6 An arrangement diagram for explaining the positional relationship of the rotation angle sensor, the pressing force sensor, and the driving circuit board as seen along a parallel direction relative to the rotation axis of the electric motor.

The arrangement (in the view parallel to the rotation axis Jmt of the electric motor) of the rotation angle sensor MKA and the pressing force sensor FBA of the driving circuit board KBN will be described with reference to an arrangement diagram of FIG. 6. Specifically, the sensors and the electronic components implemented on the circuit board KBN and the shape of the circuit board KBN will be described. Here, the circuit board KBN is a one sheet of printed substrate, and four corners thereof are fixed to the caliper CRP (especially the casing member CAS) by the fixation members KBK.

Firstly, the electronic components implemented on the circuit board KBN being a single sheet of printed substrate will be described. The connector CNC is fixed to the circuit board KBN. The signal transmission and reception and electricity supply with the ECU on the vehicle body side are performed through the connector CNC. Further, the circuit board KBN is provided with the microprocessor MPR for executing various calculation processes, the bridge circuit BRG (assembly of switching elements) for driving the electric motor MTR, the noise reduction circuit LPF for stabilizing power voltage, and other electronic components DEN are implemented (see FIGS. 2 and 4).

As illustrated by a balloon block Y in a one-dot chain line, the circuit board KBN is provided with through holes (through holes) Akn. The motor pins PMT for the electric motor MTR penetrate through the holding member HJB and are press-fitted in the through holes Akn. As the terminal shape of the motor pins PMT, the terminals for press fitting connection are employed. Here, the press fitting connection means to press fit a terminal that is somewhat wider than a through hole (through hole) of the circuit board KBN to generate contact load between the pin and the through hole to obtain electric contact therebetween. Thus, the press-fitting terminals (through hole insertion portions) of the motor pins PMT have the deformable structure (for example, a structure having cutouts Krk).

The circuit board KBN has the detection unit Kmk and the process unit Smk of the rotation angle sensor MKA implemented therein. The rotation unit Rmk of the rotation angle sensor MKA fixed to the input shaft SFI is arranged in proximity to the detection unit Kmk. In FIG. 6, the rotation unit Rmk is indicated in an example of the variable reluctance type resolver having four teeth. In the rotation angle sensor MKA, the rotation position of the rotation unit Rmk is detected by the detection unit Kmk, and the detected signal is outputted from the process unit Smk as the rotation angle detected value Mka. The rotation angle sensor MKA is fixed in surface contact with the circuit board KBN at the end face Mmk of the detection unit Kmk.

The flat face Mfb at the end of the pressing force sensor FBA is arranged to abut the flat surface of the circuit board KBN. The pressing force sensor FBA is fixed to the circuit board KBN by the pressing force pins PFB of the pressing force sensor FBA. Similar to the motor pins PMT for the electric motor MTR, the pressing force pins PFB for the pressing force sensor FBA include press-fit terminals. As illustrated by a balloon block Z in a one-dot chain line, the terminals of the pressing force pins PFB have the shape with cutouts Krk (deformable structure), and are press fitted to through holes Akn.

The circuit board KBN is arranged between the electric motor MTR, and the power converting mechanism HNK and the reduction gear GSK, and as such, a shape is employed by which the input shaft SFI for transmitting the power from the electric motor MTR to the reduction gear GSK and the output shaft SFO for transmitting the power from the reduction gear GSK to the power converting mechanism HNK can be penetrated therethrough. Specifically, the circuit board KBN is provided with the round holes Enk, and the input shaft SFI and the output shaft SFO penetrate though the round holes Enk. Further, the pressing force sensor FBA employs a hollow structure having a through hole so that the output shaft SFO may penetrate though the pressing force sensor FBA.

Workings and Effects

As mentioned above, the rotary output of the electric motor MTR is decelerated by the reduction gear GSK and is outputted to the power converting mechanism HNK. Thus, the output torque of the electric motor MTR is increased and transmitted to the power converting mechanism HNK. The rotation axis Jmt of the input shaft (which matches the rotation axis of the electric motor MTR) SFI of the reduction gear GSK and the rotation axis Jps of the output shaft (which matches the input shaft of the power converting mechanism HNK) SFO of the reduction gear GSK are parallel and are arranged apart from each other at a distance (predetermined distance djk) (called "dual axis configuration" due to having two rotation axes).

When seen from the vertical direction to the rotation axes Jmt, Jps, the circuit board KBN (one sheet of printed substrate) is located in between the "electric motor MTR, rotation angle sensor MKA" and the "reduction gear GSK". Further, when seen from the vertical direction to the rotation axes Jmt, Jps, the circuit board KBN (one sheet of printed substrate) is located in between the "power converting mechanism HNK and pressing force sensor FBA" and the "reduction gear GSK". Further, the implemented surface of the circuit board KBN (the flat surface where the processor MPR, the bridge circuit BRG, the noise reduction circuit LPF, and the like are implemented) is arranged parallel to the rotation axes Jmt, Jps. In this arrangement, at least one of the input shaft SFI and the output shaft SFO penetrates the circuit board KBN.

The circuit board KBN and the rotation angle sensor MKA are arranged close to each other, and the detection unit Kmk of the rotation angle sensor MKA is implemented on the circuit board KBN. Hereupon, the rotation unit Rmk of the rotation angle sensor MKA is fixed to the input shaft SFI which rotates integrally with the electric motor MTR. That is, the rotation angle sensor MKA is fixed at its end face Mmk to make contact with the circuit board KBN. By such an arrangement, the size of the electric motor MTR in the rotation axis Jmt direction is shortened, and the device may be reduced of its size.

Since the dual axis configuration is employed, the circuit board KBN and the pressing force sensor FBA are arranged close to each other, and the end face Mfb of the pressing force sensor FBA is fixed to make contact with the circuit board KBN. By such an arrangement, the size of the converting mechanism HNK in the rotation axis Jps direction (which is same direction as the rotation axis Jmt direction of the electric motor MTR) is shortened, and the device may be reduced of its size. Moreover, the fixation of the circuit board KBN to the caliper CRP is enhanced, and vibration durability of the device may be improved.

The circuit board KBN and the electric motor MTR are arranged close to each other, and the motor pins PMT of the electric motor MTR are press-fitted to the through holes of the circuit board KBN through the holding member HJB. The motor pins PMT have the press-fit terminals having gaps at tip ends thereof to facilitate elastic deformation. Thus, the circuit board KBN is fixed to the caliper CRP also by the holding member HJB and the motor pins PMT. Here, the holding member HJB is formed of the electrically insulated body and has the penetrated cylinder shape. By the above configuration, the fixation of the circuit board KBN to the caliper CRP is further enhanced, and the vibration durability of the device may be improved.

The invention claimed is:

1. An electric braking device for a vehicle, the device comprising:
   an electric motor configured to drive a pressing member to generate a pressing force in accordance with an operation amount of a braking operation member by a driver of the vehicle, the pressing force being a force for pressing a friction member against a rotary member that rotates integrally with a wheel of the vehicle;
   a rotation angle sensor configured to detect a rotation angle of the electric motor, said rotation angle sensor including a rotation unit which has a round disk-shape and rotates with the electric motor and a detection unit which is provided on a plane passing through the rotation unit and parallel to the rotation unit to detect the position of the rotation unit; and
   a circuit board implementing a microprocessor and a bridge circuit configured to drive the electric motor based on the rotation angle,
   wherein an end face of the detection unit of the rotation angle sensor is fixed to contact the circuit board.

* * * * *